Figure 1:
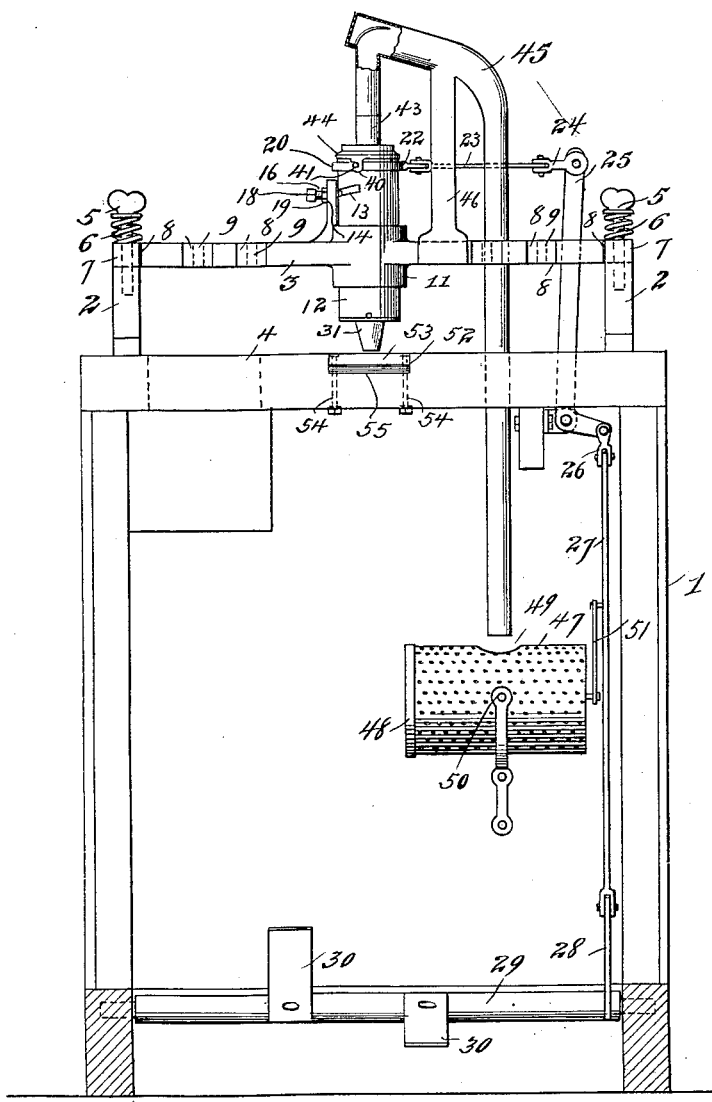

No. 655,409. Patented Aug. 7, 1900.
T. M. MULKERINS.
APPARATUS FOR CUTTING ALTAR BREAD.
(Application filed Sept. 14, 1899.)

(No Model.) 3 Sheets—Sheet 1.

Witnesses,
T. S. Mann,
Frederick F. Goodrum

Inventor,
Thomas M. Mulkerins,
By Offield, Towle & Linthicum,
Atty's.

No. 655,409. Patented Aug. 7, 1900.
T. M. MULKERINS.
APPARATUS FOR CUTTING ALTAR BREAD.
(Application filed Sept. 14, 1899.)
(No Model.) 3 Sheets—Sheet 2.
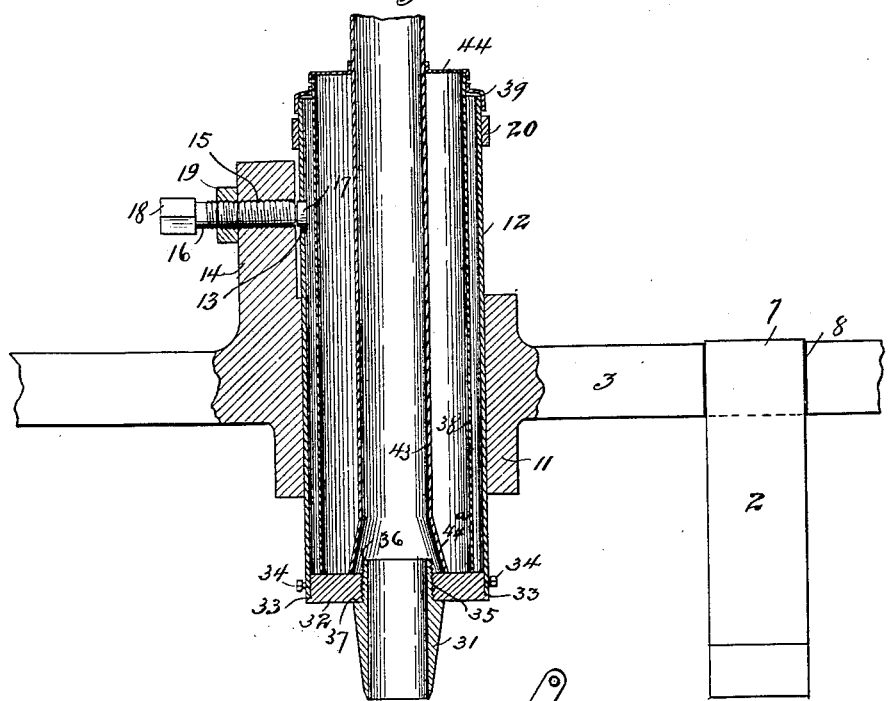
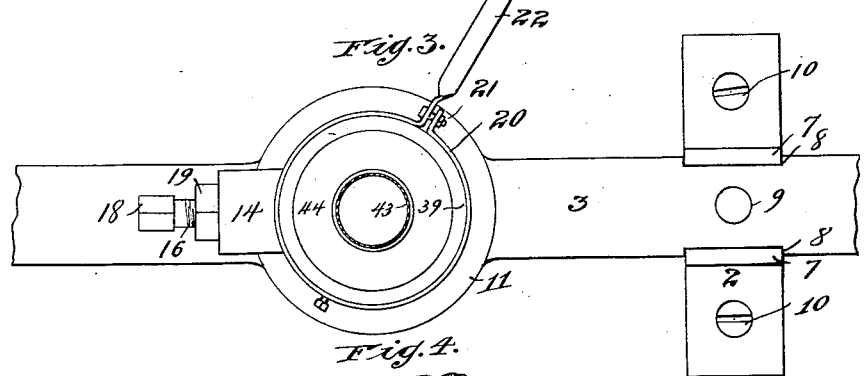
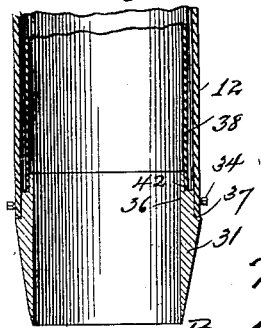
Witnesses,
Inventor,
Thomas M. Mulkerins,
By Offield, Towle & Linthicum,
Attys.

No. 655,409. Patented Aug. 7, 1900.
T. M. MULKERINS.
APPARATUS FOR CUTTING ALTAR BREAD.
(Application filed Sept. 14, 1899.)
(No Model.) 3 Sheets—Sheet 3.
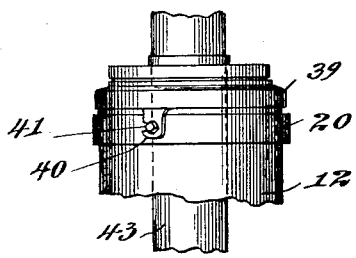
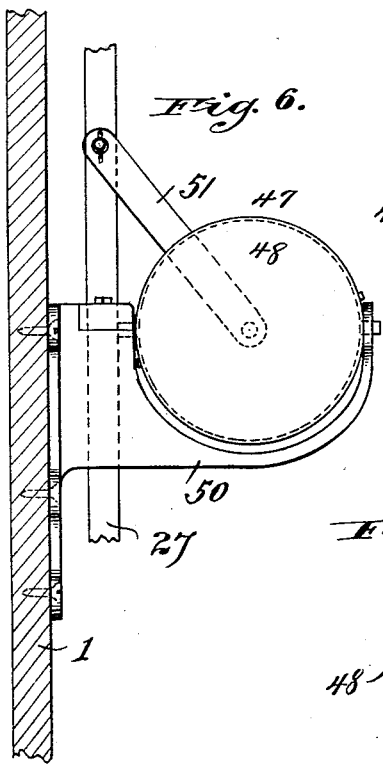
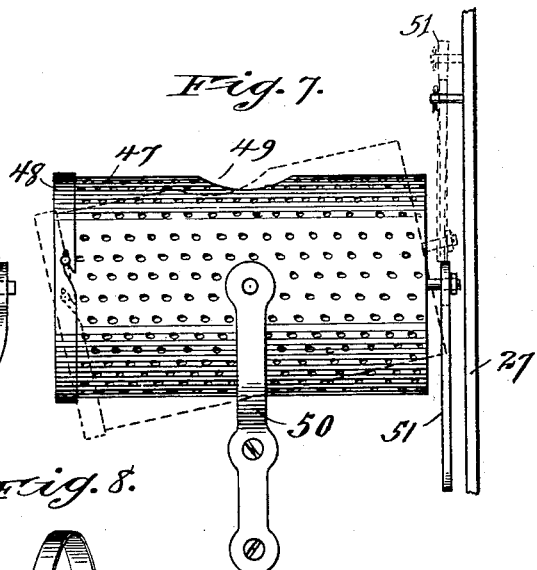
Witnesses,
Inventor,
Thomas M. Mulkerins,
By Offield, Towle & Linthicum,
Att'ys.

UNITED STATES PATENT OFFICE.

THOMAS M. MULKERINS, OF CHICAGO, ILLINOIS, ASSIGNOR TO JOHN HANLEY, OF ST. JOSEPH, MICHIGAN.

APPARATUS FOR CUTTING ALTAR-BREAD.

SPECIFICATION forming part of Letters Patent No. 655,409, dated August 7, 1900.

Application filed September 14, 1899. Serial No. 730,436. (No model.)

*To all whom it may concern:*

Be it known that I, THOMAS M. MULKERINS, a citizen of the United States, residing in the city of Chicago, in the county of Cook and State of Illinois, have invented certain new and useful Improvements in Apparatus for Cutting Altar-Bread, of which the following is a specification.

This invention relates to apparatus for cutting altar-bread, and has for its object to provide a construction whereby sheets of bread may be readily and neatly cut into circular disks or wafers.

The invention has for its object more particularly to provide an efficient mechanism whereby the bread may be readily cut in a smooth and uniform manner, the machine being adapted to the production of wafers or disks of different sizes and to operation upon sheets or loaves of bread of varying dimensions, provision being made for the automatic delivery of the disks or wafers and for the removal therefrom of dust or crumbs.

To this and other ends the invention consists in certain novel features, which I will now proceed to describe and will then particularly point out in the claims.

In the accompanying drawings, Figure 1 is a front elevation, partly in section, of an apparatus embodying my invention in one form. Fig. 2 is an enlarged detail view through the cutter and its associated mechanism, a cutter of small size being shown in place. Fig. 3 is a plan view of the structure shown in Fig. 2. Fig. 4 is a sectional view similar to the lower portion of Fig. 2, illustrating a large cutter in place. Fig. 5 is an enlarged detail view of the connection between the lining and sleeve. Fig 6 is a detail sectional view showing the screening-receptacle and its associated parts in elevation. Fig. 7 is a front elevation of the screening-receptacle and its associated parts, and Fig. 8 is a perspective view of the closure for said receptacle detached.

In the said drawings, 1 indicates a supporting frame or casing upon which are mounted standards 2, which support a cross-bar 3, which carries the cutter. The standards 2 rest upon a bed or table 4, and the cross-bar 3 is yieldingly supported above said bed or table by means of bolts 5, which pass loosely through the ends of the bar and screw into the standards, said bolts being provided with springs 6, which hold the bar yieldingly against the standards, while the standards are provided with upwardly-extending guide-flanges 7, which fit into grooves 8 in the sides of the bar. A plurality of the grooves 8 are formed along the bar 3, with corresponding apertures 9 for the passage of the bolts 5, and the standards 2 are adjustably secured by means of screws 10 to the table 4 in such manner that the standards may be adjusted closer to or farther from each other to adapt the machine for use with sheets of bread of varying size.

At its central portion the bar is provided with a bearing-ring 11, in which is mounted so as to both revolve and move vertically a sleeve 12. This sleeve is provided with a spiral groove 13, and the ring 11 is provided with a standard 14, having a threaded aperture 15 to receive a correspondingly-threaded pin 16, provided with a roller 17, which is adapted to fit within the groove 13. The pin 16 is provided with a wrench grasp or head 18, by means of which it may be turned so as to adjust it to cause the roller 17 to properly engage the spiral groove 13; and there is also provided a lock-nut 19, by means of which the pin may be secured in position after adjustment.

The sleeve 12 is provided near its upper end with a ring 20, which may be clamped in position around said sleeve by means of a bolt 21, being thus readily removable, said ring being provided with a radially-extending arm 22, which is connected by means of a rod 23 and link 24 with the upper end of the long arm of a bell-crank lever 25. The lower short end of this bell-crank lever is connected by means of a link 26 with the upper end of a connecting-rod 27, and the lower end of this rod is pivoted to a radial arm 28, projecting from a rock-shaft 29, provided with treadles 30. The links 24 and 26 have their terminal pivots arranged at right angles to each other, so as to form, in effect, universal joints between the parts which they connect. It will be seen that motion imparted to the rock-shaft 29 in one direction will, through the intervening connecting mechanism, rotate the sleeve 12 in one direction and at the same time cause it to move vertically in the bearing-ring 11, while motion imparted to the rock-shaft in the opposite direction will cause said sleeve to rotate and move longitudinally in directions the reverse of those just referred to.

The sleeve 12 carries the cutter by means of which the sheet of bread is cut into disks, and for this purpose I employ a hollow and tubular cutter 31, the lower edge of which forms the cutting edge, while the tubular interior is of a diameter such as to permit the disks cut thereby to pass upward through the interior of the cutter. In the particular construction shown in Figs. 1, 2, and 3 of the drawings the cutter is comparatively small, its external diameter being considerably less than the internal diameter of the sleeve 12, and in order to connect said cutter to the sleeve I employ a disk 32, having a peripheral seat 33 to receive the lower end of the sleeve 12, which is secured to the disk by screws 34 or other suitable means, while the central portion of the disk is provided with a threaded aperture 35 to receive a correspondingly-threaded tubular extension 36 of the cutter, which screws therein. Between this tubular extension and the body of the cutter is located a shoulder 37, which seats against the under face of the disk, and thus furnishes a firm bearing for the cutter. The tubular extension 36 preferably extends some little distance above the upper side of the connecting-disk 32 for the purpose hereinafter set forth.

Within the sleeve 12 is a lining 38, which is tubular in form and provided with a flange 39, which fits upon the upper edge of the sleeve 12, and in order to hold the lining in position it may be provided with one or more slotted lugs 40, which are adapted to engage with corresponding projections 41, carried by the sleeve 12. In the present instance one each of these lugs and projections is shown, and the projection 41 is located for convenience and strength upon the ring 20. By reason of this construction the lining-tube 38 may be readily inserted and secured within the cutter-sleeve and is readily withdrawn. This lining-sleeve is of an internal diameter substantially equal to that of the largest cutter which the machine is adapted to employ, and when said large cutter is employed in the machine the connecting-disk 32 is dispensed with, the cutter fitting directly within the sleeve 12, with its shoulder 37 abutting against the lower end of said sleeve and its tubular extension 36 fitting within the sleeve and being held by the said screws 34. With this construction of cutter the tubular extension 36 is provided with a seat 42 to receive the lower end of the lining-tube 38, and said tube forms the discharge-tube of the cutter through which the wafers pass after being cut in the manner hereinafter described. In order to coöperate with the small cutter shown in Figs. 1, 2, and 3, I employ a discharge-tube 43, which is of a diameter corresponding substantially with the internal diameter of the small cutter and which is supported within the lining-tube 38 in any suitable manner. The construction which I prefer for this purpose is that shown, in which the tube 43 is provided with a flanged diaphragm 44, which fits over the projecting end of the sleeve 38, and thus serves to center and support the tube 43. The lower end of the tube 43 is enlarged or flared, as indicated at $44^a$, for the purpose of receiving the projecting upper end of the tubular extension 36 of the small cutter and for facilitating the placing in position of the tube 43 when in use.

The discharge-tube arising vertically from the cutter is suitably connected with a downwardly-extending tubular discharge-chute 45, which may be supported from the bar 3 by means of a suitable standard 46, and which extends first in an inclined direction laterally and downwardly and then vertically downward to a point where it discharges into a suitable receptacle. I prefer to employ as such receptacle a screening or separating device by means of which all crumbs and bread-dust may be separated from the wafers. This device consists of a foraminous receptacle 47, preferably consisting of a perforated cylinder having a removable closure 48 and an opening 49, through which the wafers may be discharged into its interior from the chute 45. The cylinder is pivotally mounted in a bracket 50 and is connected with the rod 27 by means of a detachable link 51 in such a manner that the connection between the said receptacle and the link may be readily established or severed. The link 51 is shown detached in full lines in Fig. 7, and is shown connected up in dotted lines. The receptacle 47 is shown in its horizontal position in full lines in this figure and is shown tilted in dotted lines. The removable closure 48 is shown detached in Fig. 8 of the drawings.

In order to provide a suitable bed or plate against which the cutter may work, the table 4 is provided with a recess 52, in which is placed a cutting-block 53, of wood, soft metal, or the like, secured by bolts 54, so as to be readily removable. The block 53 gradually diminishes in thickness from use both by wear and by the necessary resurfacing, and as it is desirable that this upper surface should be maintained in the same plane as the upper surface of the table 4 I provide as a means for properly adjusting the position of said block a plurality of inserts 55, adapted to fit the recess 52 and to be inserted between the bottom of said recess and the under side of the block 53. By increasing or diminishing the number of these inserts the position of the upper surface of the block 53 may obviously be adjusted as desired, and by reason of the firm support which said inserts give to the entire bearing-surface of said block this latter is firmly maintained and supported in such a manner as to coöperate with the cutter to the best advantage.

The operation of the apparatus, which will be readily understood from the preceding description, is generally as follows: The proper size of cutter having been placed in position along with its discharge-tube and the several parts of the machine properly adjusted a rocking motion is imparted to the shaft 29 by means of the treadles 30, whereupon through the intervening mechanism a combined movement of rotation and reciprocation is imparted to the sleeve 12 and to the cutter carried thereby. This movement causes the cutter to descend and cut a disk from the sheet of bread lying upon the table 4, the cut being made with a drawing action, owing to the rotation of the cutter as it advances, and thus insuring a clean sharp edge for the disk being cut. The block 53, properly adjusted and supported, serves to coöperate with the cutter doing this work, while the yielding support of the bar 3 prevents any damage to the cutter or the remaining portions of the mechanism in case the cutter is depressed too far or some obstacle is encountered during the advance of the cutter. After each disk is cut the cutter moves upward and the bread is shifted to present a new portion, whereupon the cutter is again depressed and another disk is cut. The successive disks press against those which have already preceded them into the interior of the cutter and its discharge-tube, and the disks are thus fed upward until they are discharged into the chute 45, through which they descend into the receptacle provided for them. In case the separating device is employed the wafers are discharged into the receptacle 47 while this latter is stationary, the link 51 being disconnected, and when a sufficient quantity of the disks or wafers has accumulated within this receptacle the link 51 may be connected, whereupon a vibratory motion will be imparted to the receptacle, and the shaking thus given to its contents will cause the discharge of the crumbs and bread-dust through the apertures thereof. By removing the closure 48 and tilting the receptacle 47 its contents may be discharged into any suitable receiving vessel.

I do not wish to be understood as limiting myself strictly to the precise details of construction hereinbefore set forth, as they may obviously be varied without departing from the principle of my invention.

I claim—

1. In an apparatus of the character described, the combination, with a fixed bed or table, of a rotary tubular cutter supported in a suitable bearing above said table and adapted to advance and recede as it rotates, a rockshaft provided with treadles and having a projecting arm, and a bell-crank lever and rods connecting said bell-crank lever with the rockshaft arm and cutter respectively, the connections between said bell-crank lever and rods being universal, substantially as described.

2. In an apparatus of the character described, the combination, with a bed or table, of standards laterally adjustable toward and from each other, a cross-bar adapted to be connected with said standards at different points, and a rotary reciprocating tubular cutter carried by said cross-bar, substantially as described.

3. In an apparatus of the character described, the combination, with a rotating and reciprocating sleeve provided with a tubular cutter and having an inclined slot in its body portion, of a fixed pin engaging said slot, means for actuating said sleeve, a tubular lining for said sleeve provided with a flanged cover to fit said sleeve, and means for locking said sleeve and lining together, substantially as described.

4. In an apparatus of the character described, the combination, with the cutter and its operating mechanism, and a chute to receive the cut articles, of a foraminous receptacle to receive the articles from the chute, and means for connecting said receptacle with the cutter-operating mechanism to impart to the same a shaking motion, substantially as described.

5. In an apparatus of the character described, the combination, with a tubular cutter and means for actuating the same, of a chute to receive the cut articles from the cutter, a perforated cylinder pivotally mounted on a transverse axis, provided with an opening adjacent to the chute and with a removable closure at one end, and a link detachably connecting said cylinder with the cutter-operating mechanism, substantially as described.

6. In an apparatus of the character described, the combination, with a rotating and reciprocating sleeve, of a tubular cutter of smaller diameter connected with and extending upward into said sleeve, and a discharge-tube supported in said sleeve and having an enlarged end to pass over the upward extension of the cutter, substantially as described.

THOMAS M. MULKERINS.

Witnesses:
FREDERICK C. GOODWIN,
IRVINE MILLER.